United States Patent
Nam et al.

(10) Patent No.: US 8,675,599 B2
(45) Date of Patent: Mar. 18, 2014

(54) APPARATUS AND METHOD OF CHANGING ACCESS POINT IN WIRELESS NETWORK SYSTEM

(75) Inventors: Sang-Su Nam, Seoul (KR); Hye-Eun Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 589 days.

(21) Appl. No.: 12/255,110

(22) Filed: Oct. 21, 2008

(65) Prior Publication Data

US 2009/0116448 A1 May 7, 2009

(30) Foreign Application Priority Data

Nov. 1, 2007 (KR) .................. 10-2007-0110972

(51) Int. Cl.
*H04W 4/00* (2009.01)
(52) U.S. Cl.
USPC ............ 370/331; 370/401; 370/338; 455/436
(58) Field of Classification Search
None
See application file for complete search history.

(56) References Cited

U.S. PATENT DOCUMENTS

| | | | | |
|---|---|---|---|---|
| 6,980,535 | B2 * | 12/2005 | Bennett | 370/331 |
| 7,613,142 | B2 * | 11/2009 | Molteni et al. | 370/328 |
| 8,374,148 | B2 | 2/2013 | Choi et al. | |
| 2002/0025810 | A1 * | 2/2002 | Takayama et al. | 455/432 |
| 2002/0145045 | A1 * | 10/2002 | Waxelbaum | 235/462.46 |
| 2003/0005160 | A1 * | 1/2003 | Schaefer | 709/248 |
| 2003/0065784 | A1 * | 4/2003 | Herrod | 709/227 |
| 2003/0158974 | A1 * | 8/2003 | Herrod et al. | 709/328 |
| 2003/0227892 | A1 * | 12/2003 | Cabana | 370/338 |
| 2004/0066759 | A1 * | 4/2004 | Molteni et al. | 370/329 |
| 2004/0085948 | A1 * | 5/2004 | Cabana | 370/352 |
| 2004/0224690 | A1 * | 11/2004 | Choi et al. | 455/436 |
| 2004/0264427 | A1 * | 12/2004 | Jaakkola et al. | 370/338 |
| 2005/0020262 | A1 * | 1/2005 | Kim | 455/435.1 |
| 2005/0047371 | A1 * | 3/2005 | Bennett | 370/331 |
| 2005/0130658 | A1 * | 6/2005 | Stephens | 455/436 |
| 2005/0272403 | A1 * | 12/2005 | Ryu et al. | 455/403 |
| 2007/0214379 | A1 * | 9/2007 | Abraham et al. | 714/4 |
| 2010/0069064 | A1 * | 3/2010 | Hannu et al. | 455/434 |

FOREIGN PATENT DOCUMENTS

| | | |
|---|---|---|
| KR | 10-2004-0067419 A | 7/2004 |
| KR | 1020050065123 A | 6/2005 |

OTHER PUBLICATIONS

Communication dated Oct. 30, 2013, issued by the Korean Intellectual Property Office in counterpart Korean Application No. 10-2007-0110972.

\* cited by examiner

*Primary Examiner* — Bob Phunkulh
(74) *Attorney, Agent, or Firm* — Sughrue Mion, PLLC

(57) ABSTRACT

An apparatus and method of changing an access point in a wireless network system is provided. The wireless network system includes a first access point existing on a wireless network, and a user terminal accessing the first access point. The first access point transmits information on a second access point, which is one of a plurality of access points accessible by the user terminal, to the user terminal, and the user terminal determines whether to access the second access point and accesses the second access terminal in accordance with the determination result.

17 Claims, 12 Drawing Sheets

ACCESS POINT(100) : 110, 120, 130
USER TERMINAL(200) : 210, 220, 230, 240, 250

FIG. 5

| Mobile Device | Accessible AP |
|---|---|
| 1 | B |
| 2 | A, B |
| 3 | A, B, C |
| 4 | A |
| 5 | A, C |

FIG. 8

| Accessible AP | Mobile Device | Channel | Capability |
|---|---|---|---|
| A | 2, 3, 4, 5 | | |
| B | 1, 2, 3 | | |
| C | 3, 5 | | |

ACCESS POINT(100) : 110, 120, 130
USER TERMINAL(200) : 210, 220, 230, 240, 250

FIG. 11B

| Mobile Device | Accessible AP |
|---|---|
| 1 | B |
| 2 | B, C |
| 3 | A, B, C |
| 4 | A |
| 5 | A, C |

FIG. 11C

| Accessible AP | Mobile Device | Channel | Capability |
|---|---|---|---|
| A | 3, 4, 5 | | |
| B | 1, 2, 3 | | |
| C | 2, 3, 5 | | |

APPARATUS AND METHOD OF CHANGING ACCESS POINT IN WIRELESS NETWORK SYSTEM

CROSS-REFERENCE TO RELATED APPLICATION

This application is based on and claims priority from Korean Patent Application No. 10-2007-0110972 filed on Nov. 1, 2007, in the Korean Intellectual Property Office, the disclosure of which is incorporated herein in its entirety by reference.

BACKGROUND OF THE INVENTION

1. Field of the Invention

Apparatuses and methods consistent with the present invention relate to changing an access point in a wireless network system, and more particularly, to changing an access point in a wireless network system, which can provide an access point having the best performance in a wireless network system and thus improve the transmission efficiency.

2. Description of the Prior Art

The demand for the use of the Internet is increasing, and particularly, the use of the Internet through a wireless LAN is on an increasing trend. A wireless LAN provides services that are provided by a conventional short-distance wire communication, i.e., a wired LAN, by using a wireless medium. A widely-used wireless communication method is the IEEE 802.11 standard.

The wireless LAN service enables a wireless LAN terminal, such as a notebook computer, a PDA, and so forth, to access and receive various types of services, such as wireless Internet services, using an access point that serves as a wired/wireless gateway. The access point plays a role similar to that of a LAN hub, and for one access point, about 25-50 terminals can simultaneously access Internet services in an area having a radius in the range of 20-150 m.

Generally, a wireless LAN system may include several access points that use different channels in an extension service set (ESS), and a wireless LAN terminal in the extension service set performs a scan in order to find out accessible access points. In this case, the scan method may be classified into an active scan method and a passive scan method.

In the active scan method, access points are detected in a manner that a wireless LAN terminal transmits a probe request to the access points and receives probe responses from the access points. In contrast, in the passive scan method, access points are detected in a manner that the access points periodically transmit beacon frames and a wireless LAN terminal receives the transmitted beacon frames. Generally, the active scan method has been used.

As described above, in a general wireless LAN system, a wireless LAN terminal detects accessible access points by using the active scan method. In this case, the wireless LAN terminal selects an access point that has transmitted a probe response having the highest received signal strength indicator (RSSI) among probe responses received from a plurality of access points, transmits an association request to the selected access point, and receives an association response from the access point in response to the association request, so that the wireless LAN terminal and the access point are associated with each other.

However, the apparatus and method of changing an access point in a conventional wireless network system has the following problems.

Even though a user terminal first selects and accesses an access point having a good received signal strength indicator, the communication performance (e.g., bandwidth and so on) may deteriorate later due to an access of another user terminal or due to other reasons.

However, according to the conventional wireless network system, once the user terminal accesses a specified access point, it cannot know or change access to any other accessible access point having a better access environment. Accordingly, even though the user terminal can access another access point to achieve high-quality communications, the user terminal must continuously use the poor-quality wireless service. That is, since the wireless LAN terminal does not intend to access another access point in spite of an overload occurring due to the traffic concentration to one access point and the existence of an adjacent accessible access point having a better access environment, the traffic cannot be effectively distributed in a service area.

SUMMARY OF THE INVENTION

Accordingly, the present invention has been made in view of the above-mentioned problems occurring in the prior art, and an object of the present invention is to provide an apparatus and method of changing an access point in a wireless network system, which can provide better quality services to a user by transferring information on access points accessible by a user terminal to selected access points to manage the user terminal state among the access points, selecting the best-performance access point, and recommending switching to the selected access point.

Additional advantages, objects, and features of the invention will be set forth in part in the description which follows and in part will become apparent to those having ordinary skill in the art upon examination of the following or may be learned from practice of the invention.

In order to accomplish these objects, there is provided a wireless network system, according to an exemplary embodiment of the present invention, which includes a first access point existing on a wireless network; and a user terminal accessing the first access point; wherein the first access point transmits information on a second access point, which is one of a plurality of access points accessible by the user terminal, to the user terminal, and the user terminal judges whether to access the second access point and accesses the second access terminal in accordance with the result.

In another aspect of the present invention, there is provided a method of changing an access point in a wireless network system, which includes: a user terminal accessing a first access point; the first access point transmitting information on a second access point, which is one of a plurality of access points accessible by the user terminal, to the user terminal; the user terminal determining whether to access the second access point; and accessing the second access point if accessing the second access point is chosen.

BRIEF DESCRIPTION OF THE DRAWINGS

The above and other objects, features and advantages of the present invention will be apparent from the following detailed description taken in conjunction with the accompanying drawings, in which:

FIG. 5 is a view illustrating information on access points accessible by user terminals in the wireless network system of FIG. 1, according to an exemplary embodiment of the present invention;

FIG. 8 is a view illustrating an example of an access point managing information on access points accessible by a user terminal in a table, according to an exemplary embodiment of the present invention;

FIG. 11B is a view illustrating an example of access points accessible by user terminals, according to an exemplary embodiment of the present invention; and FIG. 11C is a view illustrating an example of an access point information table managed by an access point, according to an exemplary embodiment of the present invention.

DETAILED DESCRIPTION OF EXEMPLARY EMBODIMENTS OF THE PRESENT INVENTION

Figure 1:
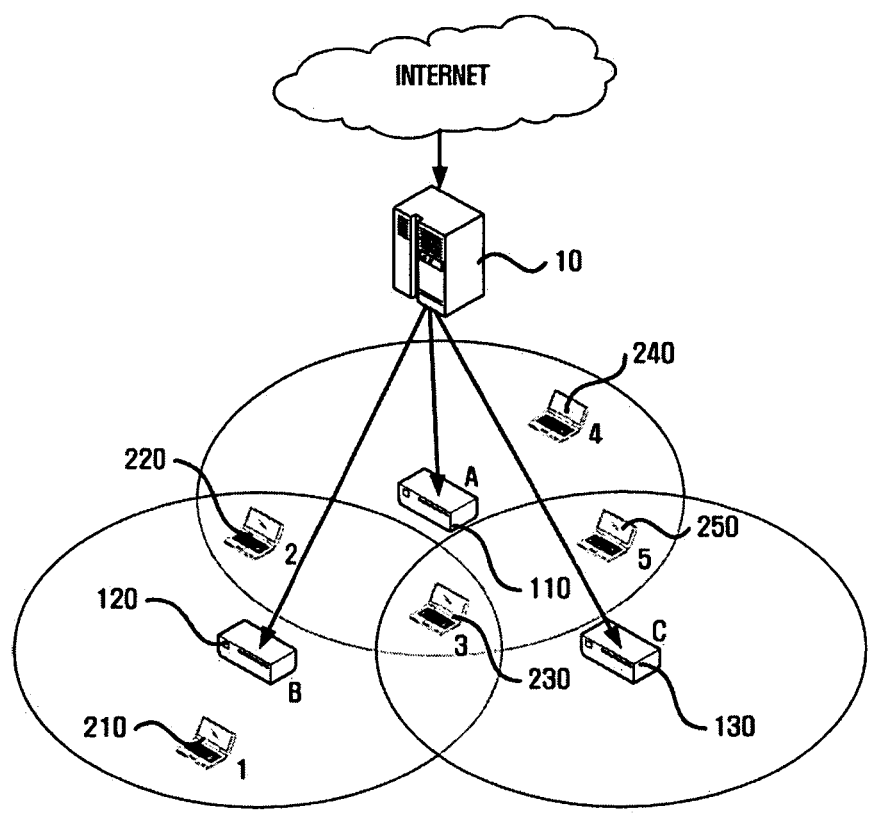
FIG. 1 is a block diagram illustrating the construction of a wireless network system according to an exemplary embodiment of the present invention.

Hereinafter, exemplary embodiments of the present invention will be described in detail with reference to the accompanying drawings. The aspects and features of the present invention and methods for achieving the aspects and features will be apparent by referring to the exemplary embodiments to be described in detail with reference to the accompanying drawings. However, the present invention is not limited to the exemplary embodiments disclosed hereinafter, but can be implemented in diverse forms. The matters defined in the description, such as the detailed construction and elements, are only specific details provided as examples to assist those of ordinary skill in the art in a comprehensive understanding of the invention, and the present invention is defined within the scope of the appended claims. In the entire description of the present invention, the same drawing reference numerals are used for the same elements across various figures.

The present invention will be described herein with reference to the accompanying drawings illustrating block diagrams and flowcharts for explaining an apparatus and method of changing an access point in a wireless network system according to exemplary embodiments of the present invention.

It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed by the processor of the computer or other programmable data processing apparatus, create means for implementing the functions specified in the flowchart block or blocks.

These computer program instructions may also be stored in a computer usable or computer-readable memory and can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded into a computer or other programmable data processing apparatus to cause a series of operational steps to be performed in the computer or other programmable apparatus to produce a computer implemented process such that the instructions are executed by the computer or other programmable apparatus provide steps for implementing the functions specified in the flowchart block or blocks.

Also, each block of the flowchart illustrations may represent a module, segment, or portion of code, which comprises one or more executable instructions for implementing the specified logical function(s). It should also be noted that in some alternative implementations, the functions noted in the blocks may occur out of the order shown by example. For example, two blocks shown in succession may in fact be executed substantially concurrently or the blocks may sometimes be executed in the reverse order, depending upon the functionality involved.

Hereinafter, the apparatus and method of changing an access point in a wireless network system according to exemplary embodiments of the present invention will be described with reference to the accompanying drawings.

FIG. 1 is a block diagram illustrating the construction of a wireless network system according to an exemplary embodiment of the present invention.

The wireless network system according to an exemplary embodiment of the present invention includes a server 10, access points (APs) 100; 110, 120, and 130, and user terminals 200; 210, 220, 230, 240, and 250.

Figure 2:
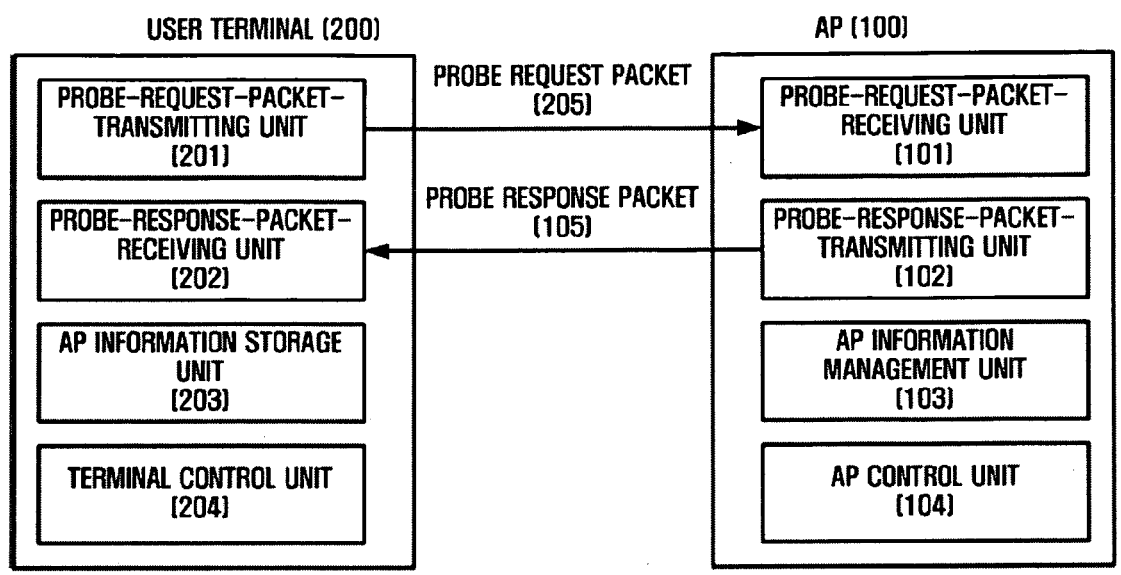
FIG. 2 is a block diagram illustrating the construction of an access point and a user terminal in a wireless network system according to an exemplary embodiment of the present invention.

FIG. 2 is a block diagram illustrating the construction of an access point 100 and a user terminal 200 in a wireless network system according to an exemplary embodiment of the present invention.

The access point (AP) 100 includes a probe-request-packet-receiving unit 101, a probe-response-packet-transmitting unit 102, an access point (AP) information management unit 103, and an AP control unit 104.

The probe-request-packet-receiving unit 101 serves to receive a probe request packet 205 transmitted from the user terminal 200.

The probe-response-packet-transmitting unit 102 serves to transmit a probe response packet 105 to the user terminal 200 in response to the probe request packet 205 transmitted from the user terminal 200.

The AP information management unit 103 serves to manage information on access points (APs) 100 accessible by and transmitted from the user terminal 200. That is, the user terminal 200 communicates with accessible APs 100 to send/receive information on the type and the number of user terminals 200, association channels, accommodation capabilities, and so forth.

The AP control unit 104 serves to control the operation of the probe-request-packet-receiving unit 101, the probe-response-packet-transmitting unit 102, and the AP information management unit 103.

The user terminal 200 includes a probe-request-packet-transmitting unit 201, a probe-response-packet-receiving unit 202, an AP information storage unit 203, and a user terminal control unit 204.

The probe-request-packet-transmitting unit 201 serves to successively transmit a probe request packet 205 to the AP 100 existing in the network in order to search for the AP 100.

The probe-response-packet-receiving unit 202 serves to receive a probe response packet 105 transmitted from the AP 100.

The AP information storage unit 203 serves to manage information on APs 100 accessible by the user terminal 200. That is, the user terminal 200 can manage information on the accessible APs 100 by periodically searching for neighboring APs 100.

The user terminal control unit 204 serves to control the operation of the probe-request-packet-transmitting unit 201, the probe-response-packet-receiving unit 202, and the AP information storage unit 203.

Hereinafter, a method of setting APs in a wireless network system as constructed above is described according to an exemplary embodiment of the present invention.

Figure 3:
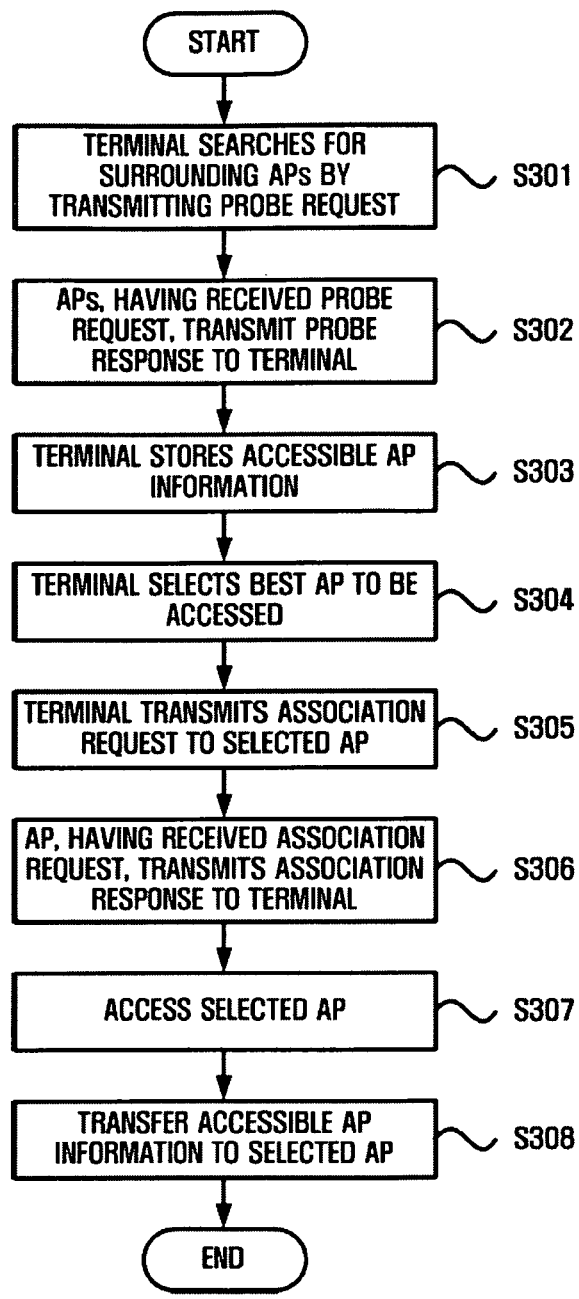
FIG. 3 is a flowchart illustrating a process of selecting an access point in a wireless network system according to an exemplary embodiment of the present invention.

FIG. 3 is a flowchart illustrating a process of selecting an AP in a wireless network system according to an exemplary embodiment of the present invention.

First, the user terminal 200 searches for APs 100 to access the APs 100 existing in the wireless network system.

Preferably, the user terminal 200 performs an active scan in order to search for the APs 100. First, the user terminal 200 successively transmits probe request packets 205 to the APs 100 existing in the network S301.

Figure 4A:
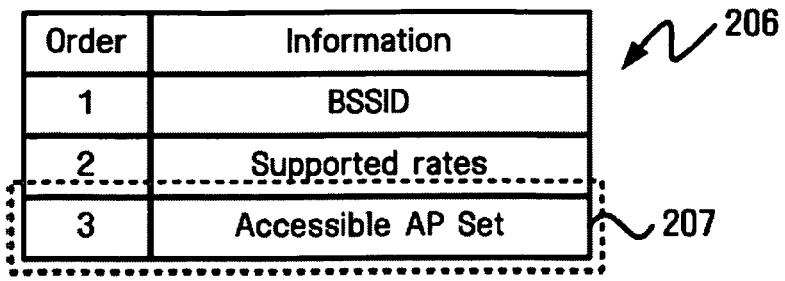
FIG. 4A is a view illustrating the structure of a probe request frame transmitted from a user terminal to an access point, according to an exemplary embodiment of the present invention.

FIG. 4A is a view illustrating the structure of a probe request frame transmitted from a user terminal to an AP, according to an exemplary embodiment of the present invention.

As shown in FIG. 4A, the probe request packet frame 206 includes information on a Basic Service Set Identifier (BSSID), rates supported by the user terminal, and an accessible AP set 207. The accessible AP set 207 will be described later.

Referring to FIG. 3, the AP 100, having received the probe request from the user terminal 200, transmits the probe response packet 105 to the user terminal 200 S302.

Figure 4B:
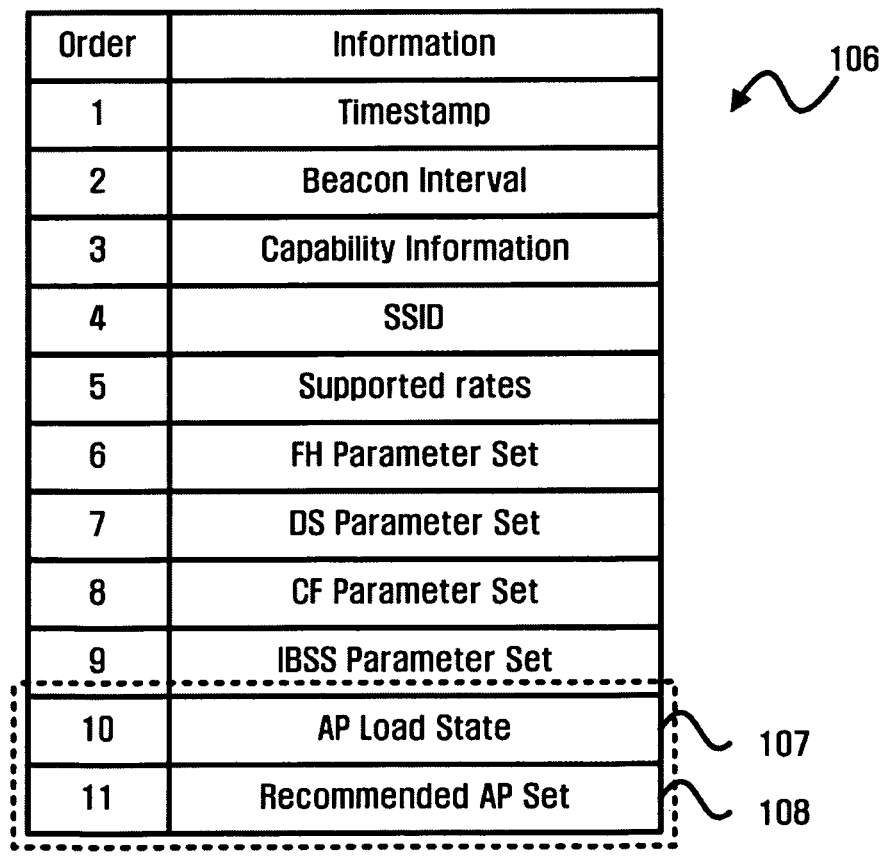
FIG. 4B is a view illustrating the structure of a probe response frame transmitted from an access point to a user terminal, according to an exemplary embodiment of the present invention.

FIG. 4B is a view illustrating the structure of a probe response frame transmitted from an AP to a user terminal, according to an exemplary embodiment of the present invention.

As shown in FIG. 4B, the probe response packet frame 106 of the AP 100 includes various information on the AP 100.

Preferably, the probe response packet frame 106 includes information on a timestamp, a beacon interval, capability information, an SSID, supported rates, an FH parameter set, a DS parameter set, a CF parameter set, an IBSS parameter set, AP load states 107, and a recommended AP set 108.

FIG. 5 is a view illustrating information on APs accessible by user terminals in the wireless network system of FIG. 1, according to an exemplary embodiment of the present invention.

In the wireless network system of FIG. 1, the user terminal 2 220 can access an AP A 110 and an AP B 120.

Referring to FIG. 3, the user terminal 200 stores therein information on the access points 100 accessible by the user terminal S303. Also, the user terminal 200 selects the most proper access point 100 among the access points 100 accessible by the user terminal S304. The user terminal 200 may select the access point having the strongest RSSI through the probe responses received from the access points 100. Since the access points transmit not only RSSIs but also traffic information, the user terminal 200 can effectively select the most proper access point at the initial stage.

Then, the user terminal 200 transmits an association request to the selected access point 100 S305, and the access point 100, having received the association request, transmits an association response to the user terminal 200 S306.

Then, the user terminal 200 accesses the selected access point 100 S307, and transmits information on the access points 100 accessible by the user terminal itself to the selected access point 100 S308.

Referring to FIG. 4A, in the wireless network system according to an exemplary embodiment of the present invention, the user terminal 200 includes information on the accessible AP set 207 in the probe request packet frame 206 that is transmitted to the access point 100. The accessible AP set 207 may include information on the access points 100 accessible by the user terminal 200. Accordingly, the user terminal 200 transmits information on the AP set accessible by itself to the selected AP 100 when it accesses the selected AP 100.

The probe request packet frame 206 transmitted/received between the user terminal 200 and the AP 100 is compatible with the conventional AP. In the case of the probe request packet 205, the BSSID may be allocated to the SSID field. Also, a field including the accessible AP set 207 is defined in a reserved field. Accordingly, the operation of the user terminal 200 in association with the conventional access point 100 causes no problems, and the compatibility can be maintained.

Figure 6:
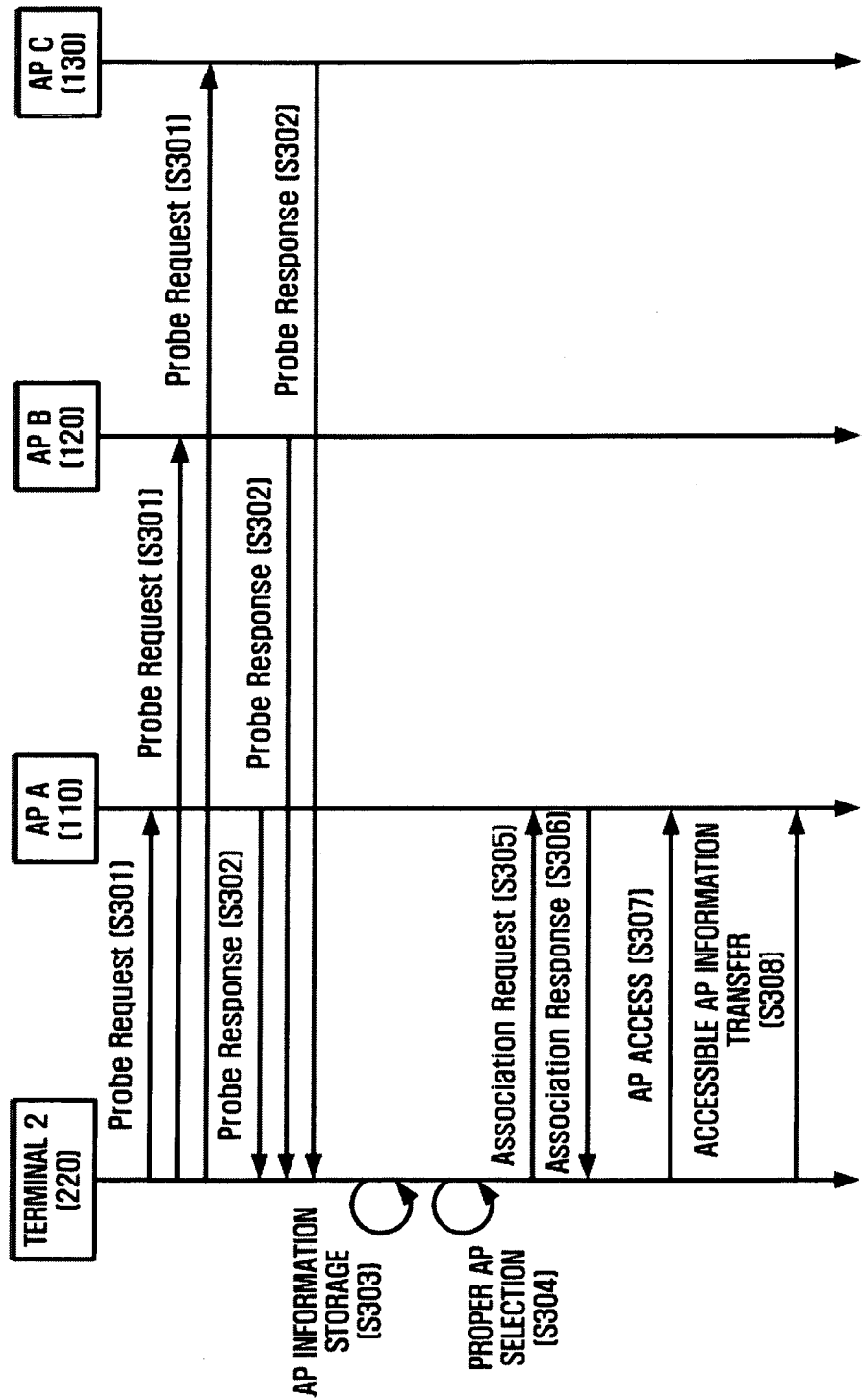
FIG. 6 is a view illustrating an example of a user terminal selecting an access point in the wireless network system of FIG. 3, according to an exemplary embodiment of the present invention.

FIG. 6 is a view illustrating an example where a user terminal selects an access point in the wireless network system of FIG. 3, according to an exemplary embodiment of the present invention.

In FIG. 6, it is exemplified that the user terminal 2 220 selects and accesses the access point A 110. In order to search the access points 100, the user terminal 2 220 successively transmits probe request packets 205 to the access points 100 existing in the network S301. Access points A, B and C, having received the probe request packets 205 from the user terminal 2 220, transmit probe response packets 105 to the user terminal 200 S302. Then, the user terminal 200 stores information on the accessible access point A 110 and access point B 120 S303. The user terminal 2 220 can select the most proper access point 100, for example, the access point A 110 S304. Then, the user terminal 2 220 transmits an association request to the selected access point A110 S305, and the access point A110 transmits an association response to the user terminal 2 220 S306. Then, the user terminal 2 220 accesses the access point A 110 S307, and transmits information on the access point B 120 accessible by the user terminal itself to the access point A 110 S308.

Figure 7:
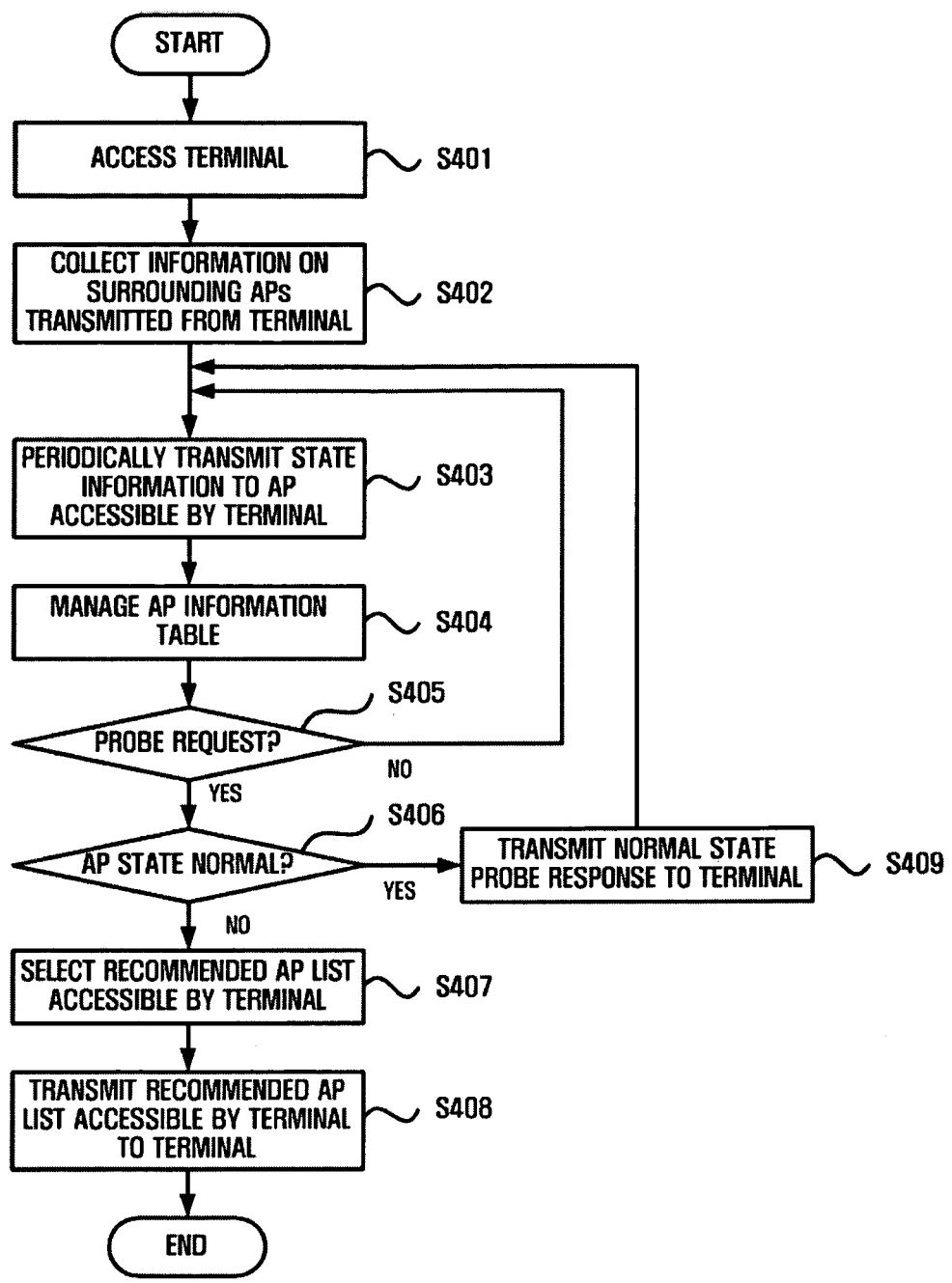
FIG. 7 is a flowchart illustrating an operation process of an access point after a user terminal accesses the access point in a wireless network system according to an exemplary embodiment of the present invention.

FIG. 7 is a flowchart illustrating an operation process of an access point after a user terminal accesses the access point in a wireless network system according to an exemplary embodiment of the present invention.

As shown in FIG. 7, the access point accesses the user terminal 200 S401. Then, the access point 100 receives information on the access points 100 accessible by the user terminal 200 from the user terminal 200 S402. In the case of a wireless network system as constructed in FIG. 1, the access points 100 accessible by the user terminal 200 are access point A 110 and access point B 120. Since the user terminal 200 has selected and accessed the access point A 110, information on the access point B 120 is transmitted to the access point A 110.

Then, the access point 100 periodically transmits state information to the access points 100 accessible by the user terminal 200 S403. Since the access points 100 are connected by wire, they can communicate with one another based on AP information provided by the user terminal 200. If a request for information is received from another access point 100, the respective access point 100 transmits a packet that contains information on the type and the number of user terminals connected thereto, association channels, accommodation capabilities, and so forth, and receives information from other access points 100.

In addition, the access point 100 manages information on the access points 100 accessible by the user terminal 200 S404.

FIG. 8 is a view illustrating an example where an access point manages information on access points accessible by a user terminal in a table, according to an exemplary embodiment of the present invention.

As illustrated in FIG. 8, the access point 100 exchanges state information with the access points 100 accessible by the user terminal 200, and manages information on the type and the number of user terminals 200 accessible to the respective access points 100, association channels, accommodation capabilities, and so forth, in a table. Such information is updated through a periodic information exchange with the surrounding access points 100.

Referring to FIG. 7, the access point 100 determines whether a probe request has been received from the user terminal 200 S405. If the probe request has been received from the user terminal 200, the access point 100 determines whether the access point is in a normal state by confirming its state S406.

If the access point 100 judges that it is not in a normal state, such as quality deterioration due to overload, it selects a list of access points 100, of which the access is judged to be smooth, based on the state information of the access points 100 accessible by the user terminal 200 S407, and transmits the selected list of access points 100 to the user terminal S408.

That is, if many terminals access the access point 100 or the amount of traffic is increased to lower the transmission service below a predetermined value, another access point 100 that is in a good transmission state is searched for and selected in the AP information table as illustrated in FIG. 8. Then, the access point 100 transmits a probe response packet 105 including information on the current AP load state 107 and a recommended AP set 108 as illustrated in FIG. 4B. Accordingly, the access point 100 selects the user terminal 200 through information received from other access points 100, and thus the traffic amount can be effectively adjusted. Meanwhile, the user terminal 200 can effectively receive the wireless service from the access point 100.

Referring to FIG. 4B, in the wireless network system according to an exemplary embodiment of the present invention, the access point 100 includes information on the AP load state 107 and the recommended AP set 108 in the probe response packet frame 106 to be sent to the user terminal 200.

The AP load state 107 is information indicating the state of the access point 100 such as the transmission quality of the currently accessed access point 100. Also, the recommended AP set 108 is information on the recommended access point that is in the best transmission state among the access points 100 accessible by the user terminal 200.

Accordingly, the access point 100 transmits information on the access-recommended AP set depending on its own state and the state of the access points accessible by the user terminal 200.

The frame of the probe response packet 105 that is transmitted between the user terminal 200 and the access point 100 is kept compatible with conventional access points 100. In the case of the probe response packet 105, the capability information field and the reserved field are used. In addition, a field including the AP load state 107 and a field including the recommended AP set 108 are defined in the reserved field. Accordingly, the operation of the user terminal 200 in association with the conventional access points 100 causes no problems, and the compatibility can be maintained.

If the access point 100 judges that it is in a normal state S406 in FIG. 7, it transmits a normal-state probe response packet 105 to the user terminal 200 accessing the access point 100 S409.

Figure 9:
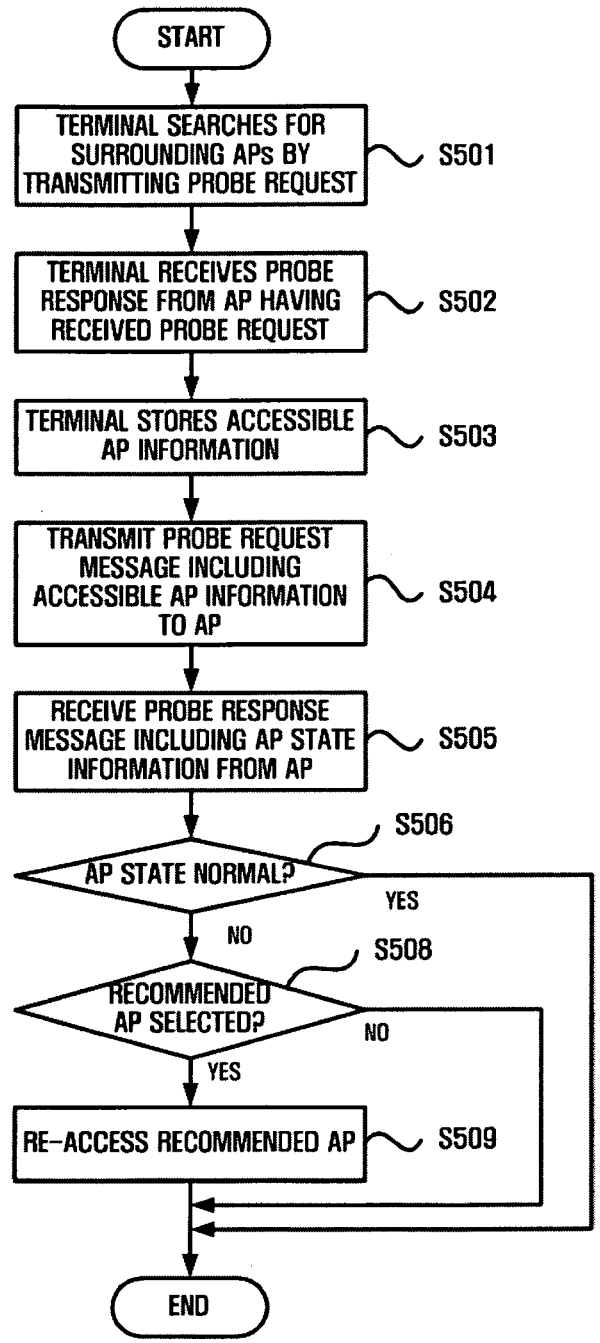
FIG. 9 is a flowchart illustrating a process in which a user terminal re-accesses a new access point in a wireless network system according to an exemplary embodiment of the present invention.

FIG. 9 is a flowchart illustrating a process in which a user terminal re-accesses a new access point in a wireless network system according to an exemplary embodiment of the present invention.

Even after the user terminal 200 selects and accesses a specified access point 100, the user terminal 200 can periodically searches the surrounding access points 100. That is, the user terminal 200 successively transmits probe request packet 205 to the access points 100 existing in the network S501, and receives probe response packets 105 from the access points 100 having received the probe request packets 205 S502. This is because the accessible access points 100 may be added or deleted due to the movement of the user terminal 200. Details of this function will be described later with reference to FIGS. 11A to 11C.

In addition, the user terminal 200 stores information on the access points 100 accessible by the user terminal S503. Also, the user terminal 200 transmits information on the access points 100 accessible by the user terminal itself to the accessed access point 100 S504. At this time, since the information on the existing access points 100 has already been stored, the user terminal 200 can transmit only the information on the changed access point 100 to achieve an efficient transmission.

The user terminal 200, as described above with reference to FIG. 7, receives the probe response including the AP load state 107 and the recommended AP set 108 from the access point 100 having received the probe request packet 205 S505.

Then, the user terminal 200 judges whether the current access is in a normal state through the AP load state 107 in the probe response S506.

If it is judged that the access point 100 is not in a normal state, the user terminal 200 judges whether to change the access point through the recommended AP set 108 in the probe response packet 105 S508. If a re-access to the recommended access point is desired as a result of judgment, the user terminal terminates the access to the existing access point and attempts to access the recommended access point S509.

Figure 10:
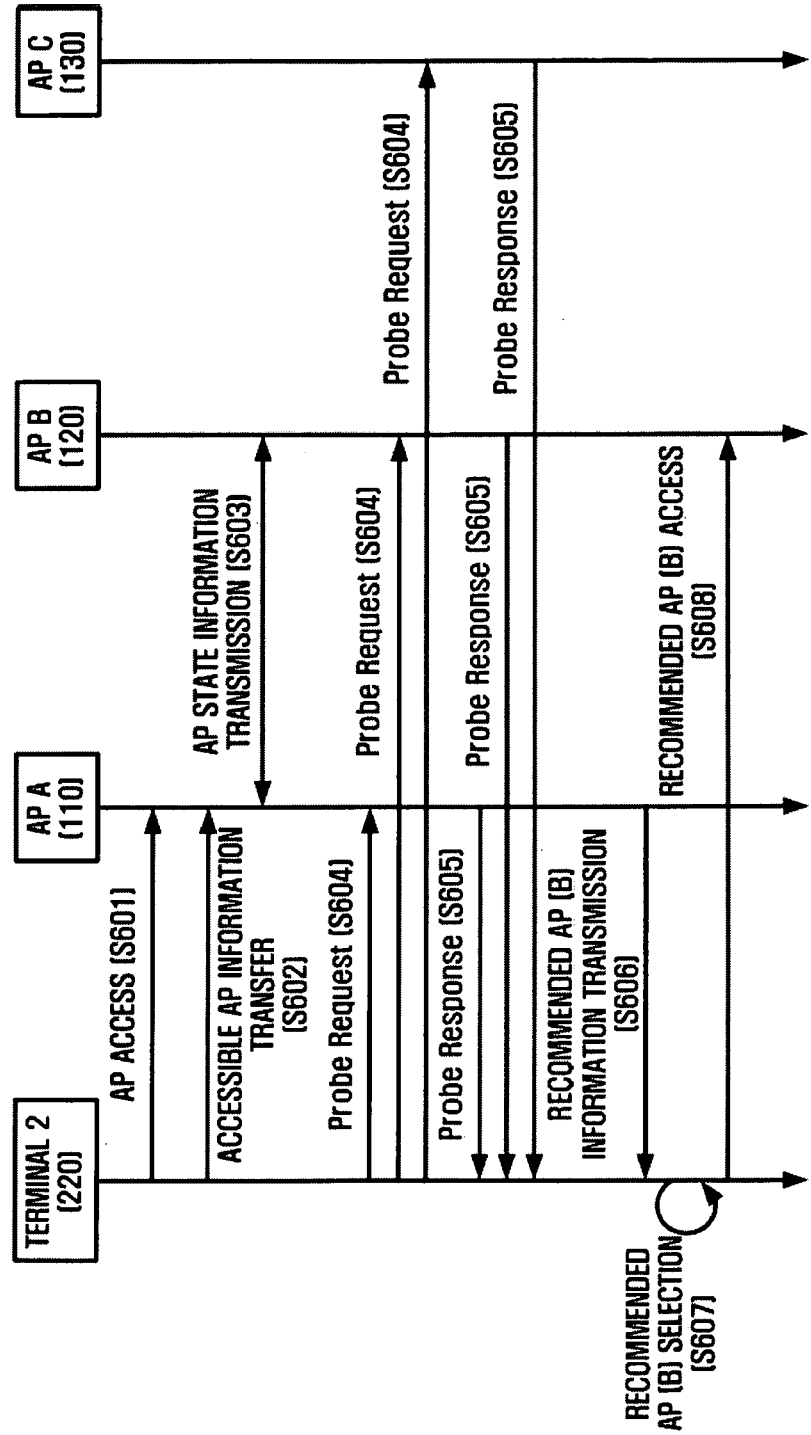
FIG. 10 is a view illustrating an example of a user terminal re-accessing a new access point in the wireless network system of FIG. 1, according to an exemplary embodiment of the present invention.

FIG. 10 is a view illustrating an example where a user terminal re-accesses a new access point in the wireless network system of FIG. 1, according to an exemplary embodiment of the present invention.

In FIG. 10, it is exemplified that user terminal 2 220, accessing access point A 110, re-accesses access point B 120. The user terminal 2 220 selects and accesses the access point A 110 S601, and then transmits information on the access point B 120 in addition to the information on the access point A 110 S602. Thereafter, the access point A 110 receives information on the access point B 120, for example, information on the type and the number of user terminals 200 accessing the access point B 120, association channels, accommodation capabilities, and so forth, S603 by communicating with the access point B 120, and manages the information on the access point A 110 and the access point B 120

In contrast, the user terminal 2 220 periodically searches the surrounding access points 110, 120, and 130. For this, the user terminal 2 220 transmits the probe request packet 205 S604 in the active scan method, and receives the probe response packet 105 S605. The access point A 110, having received the probe request packet 205 from the user terminal 2 220, transmits the probe response packet 105 including the AP load state 107 and the recommended AP set 108 to the user terminal 2 220 S606. Then, the user terminal 2 220 selects the access point B 120 recommended by the access point A 110 S607, and re-accesses the access point B 120 S608.

Figure 11A:
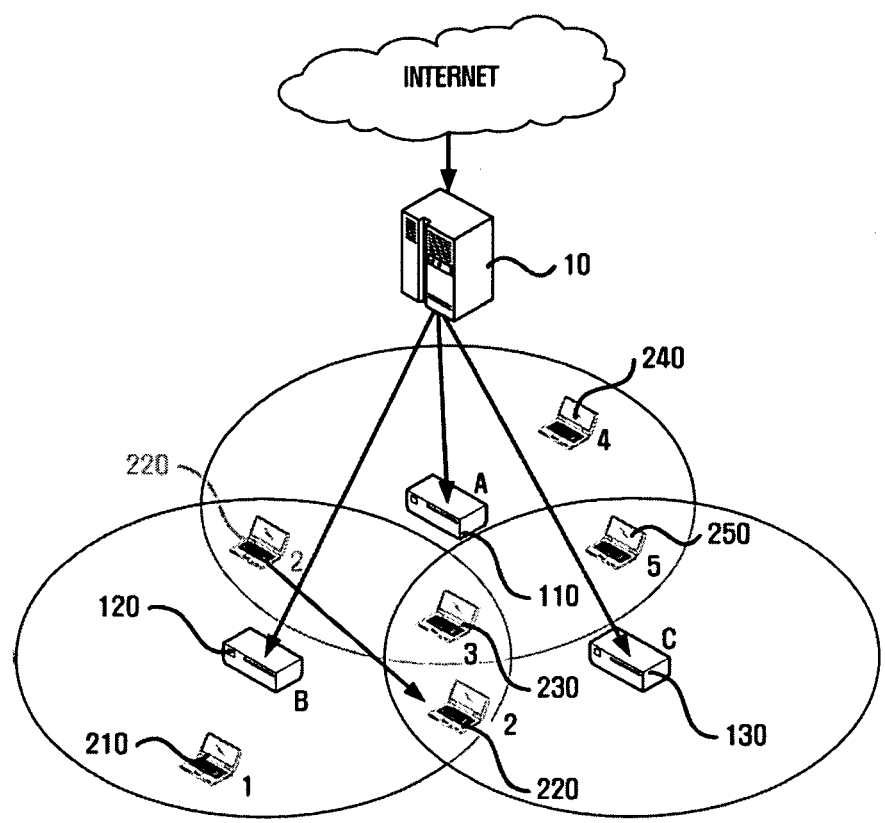
FIG. 11A is a view illustrating an example of a user terminal moving in a wireless network system of FIG. 1, according to an exemplary embodiment of the present invention.

FIG. 11A is a view illustrating an example where a user terminal moves in the wireless network system of FIG. 1, FIG. 11B is a view illustrating an example of access points accessible by user terminals, and FIG. 11C is a view illustrating an example of an AP information table managed by an access point.

As illustrated in FIGS. 11A and 11B, if the user terminal 2 220 moves, access points accessible by the user terminal 2 220 are changed from access point A 110 and access point B 120 to access point B 120 and access point C 130. The user terminal 2 220 transmits the probe request packet 205 indicating that the access points accessible by the user terminal 2 220 have been changed from access points A 110 and B 120 to access points B 120 and C 130 to the access point A 110 being accessed by the user terminal 2 220. The access point A 110 receives information on the access point B 120 and the access point C 130 by communicating with the access point B 120 and the access point C 130, and updates the existing AP information table as illustrated in FIG. 8 to the AP information table as illustrated in FIG. 11C. Then, the access point A 110 transmits the probe response packet 105 including the information on the access point B 120 and the access point C 130 to the user terminal 2 220. Accordingly, the user terminal 2 220 terminates the access to the access point A 110 and accesses the access point B 120 or the access point C 130.

According to the conventional wireless network system, once the user terminal accesses a specified access point, it cannot know of change access to any other accessible access point having a better access environment. Accordingly, even though the user terminal is in range of another access point which can achieve higher-quality communications, the user terminal cannot but continuously use the poor-quality wireless service. That is, since the wireless LAN terminal does not intend to access another access point in spite of an overload occurring due to the traffic concentration to one access point and the existence of an adjacent accessible access point having a better access environment, the traffic cannot be effectively distributed in a service area.

However, according to the wireless network system according to an exemplary embodiment of the present invention, an access point, which is accessed by a user terminal accessible to a plurality of access points, dynamically analyzes information on the performance change of the access points accessible by the user terminal, and transfers the analyzed information to the user terminal.

Accordingly, information on the access points accessible by the user terminal is transferred to the selected access point to manage the user terminal state among the access points, the best-performance access point is selected, and switching to the selected access point is recommended, so that better quality services can be provided to the user. Also, if the quality of the access point accessed by the user terminal is lowered below a predetermined value, a good-quality access point is re-accessed to adjust the load balance, and thus an efficient transmission is performed. Also, since the user terminal does not transmit the accessible AP information only at an initial stage, but transfers new information by periodically searching for surrounding access points, the access points can be effectively used even if the accessible access points are changed due to the movement of the user terminal.

In the exemplary embodiments of the present invention, the term "unit", as used herein, means, but is not limited to, a software or hardware component, such as a Field Programmable Gate Array (FPGA) or an Application Specific Integrated Circuit (ASIC), which performs certain tasks. A unit may advantageously be configured to reside on the addressable storage medium and configured to be executed on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units. In addition, the components and modules may be implemented so as to execute one or more CPUs in a device.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:
1. A wireless network system comprising:
a first access point which exists on a wireless network; and
a user terminal which accesses the first access point;
wherein the first access point periodically analyzes information on a performance of a plurality of access points and transmits the analyzed information about a second access point, which is one of the plurality of access points accessible by the user terminal, to the user terminal, and
wherein the user terminal determines whether to access the second access point and accesses the second access point in accordance with a result of the determination, and
wherein the first access point transmits the analyzed information if a transmission quality of the first access point is deteriorated,
wherein in accessing the first access point the user terminal transmits a probe request packet, receives probe response packets in response to the probe request packet from the plurality of access points, selects and accesses the first access point, and transmits information about the plurality of access points to the first access point.

2. The wireless network system of claim 1, wherein the information on the plurality of access points is inputted to an accessible access point set field included in the probe request packet to be transmitted.

3. The wireless network system of claim 1, wherein the user terminal determines whether to access the second access point by determining whether a performance of the second access point is greater than a performance of the first access point.

4. The wireless network system according to claim 1, wherein the user terminal actively scans the plurality of access points.

5. The wireless network system according to claim 1, wherein the first access point dynamically analyzes the information on the performance of the plurality of access points during accessing or receiving of a service in the wireless network.

6. The wireless network system according to claim 1, wherein the first access point periodically analyzes information, without instruction from the user terminal, on the performance of a plurality of access points and transmits the analyzed information about the second access point to the user terminal.

7. A wireless network system comprising:
a first access point which exists on a wireless network; and
a user terminal which accesses the first access point;
wherein the first access point periodically analyzes information on a performance of a plurality of access points and transmits the analyzed information about a second access point, which is one of the plurality of access points accessible by the user terminal, to the user terminal, and
wherein the user terminal determines whether to access the second access point and accesses the second access point in accordance with a result of the determination, and
wherein the first access point transmits the analyzed information if a transmission quality of the first access point is deteriorated,
wherein the first access point receives information on performance from the plurality of access points, determines whether the first access point is in a normal state, selects an access point having the best performance among the plurality of access points as the second access point if the first access point is determined to not be in a normal state, and transmits information on the second access point to the user terminal.

8. The wireless network system of claim 7, wherein the information on the performance includes accommodation capabilities of the plurality of access points.

9. The wireless network system of claim 7, wherein the information on the second access point is inputted to a recommended access point set field included in a probe response packet of the first access point to be transmitted.

10. The wireless network system of claim 9, wherein the probe response packet further includes an access point load state field for inputting a load state of the first access point.

11. A method of changing an access point in a wireless network system, the method comprising:
accessing a first access point from a user terminal;
periodically analyzing information on a performance of a plurality of access points;
transmitting the analyzed information about a second access point, which is one of the plurality of access points accessible by the user terminal, from the first access point to the user terminal;
determining by the user terminal whether to access the second access point; and
accessing the second access point from the user terminal if an access to the second access point is desired as a result of the determination, and
wherein the first access point transmits the analyzed information if a transmission quality of the first access point is deteriorated,
wherein the accessing the first access point comprises:
transmitting a probe request packet from the user terminal;
receiving probe response packets at the user terminal in response to the probe request packet from the plurality of access points;
selecting and accessing, by the user terminal, the first access point among the plurality of access points using the probe response packets; and
transmitting information about the plurality of access points from the user terminal to the first access point.

12. The method of claim 11, wherein the information on the plurality of access points is inputted to an accessible access point set field included in the probe request packet to be transmitted.

13. The method of claim 11, wherein the determining comprises determining whether to access the second access point by determining whether a performance of the second access point is greater than a performance of the first access point.

14. A method of changing an access point in a wireless network system, the method comprising:
accessing a first access point from a user terminal;
periodically analyzing information on a performance of a plurality of access points;
transmitting the analyzed information about a second access point, which is one of the plurality of access points accessible by the user terminal, from the first access point to the user terminal;
determining by the user terminal whether to access the second access point; and
accessing the second access point from the user terminal if an access to the second access point is desired as a result of the determination, and
wherein the first access point transmits the analyzed information if a transmission quality of the first access point is deteriorated,
wherein the transmitting comprises:
receiving information at the first access point on performance from the plurality of access points;
determining whether the first access point is in a normal state;
selecting an access point having the best performance among the plurality of access points as the second access point and transmitting information on the second access point to the user terminal, if the first access point is determined not to be in a normal state.

15. The method of claim 14, wherein the information on the performance includes accommodation capabilities of the plurality of access points.

16. The method of claim 14, wherein the information on the second access point is inputted to a recommended access point set field included in a probe response packet of the first access point to be transmitted.

17. The method of claim 16, wherein the probe response packet further includes an access point load state field for inputting a load state of the first access point.

* * * * *